May 8, 1934.  T. M. RECTOR  1,957,554
METHOD OF FORMING TRANSPARENT CONTAINERS
Filed July 26, 1929   2 Sheets-Sheet 1
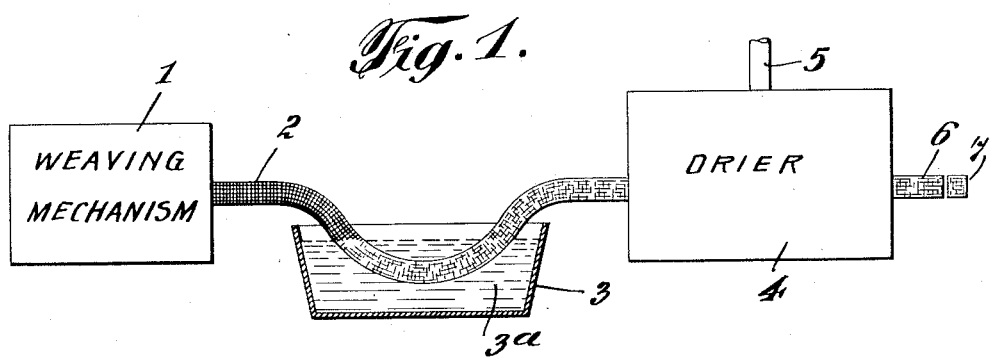
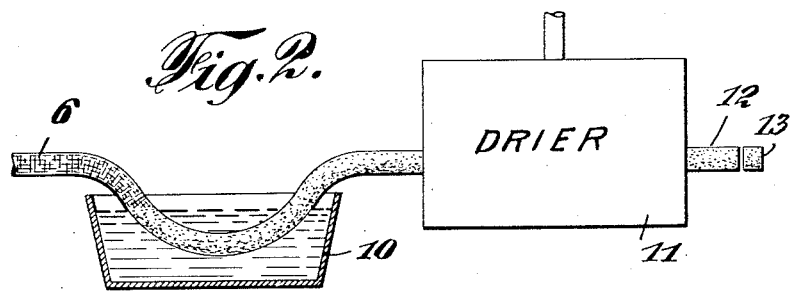
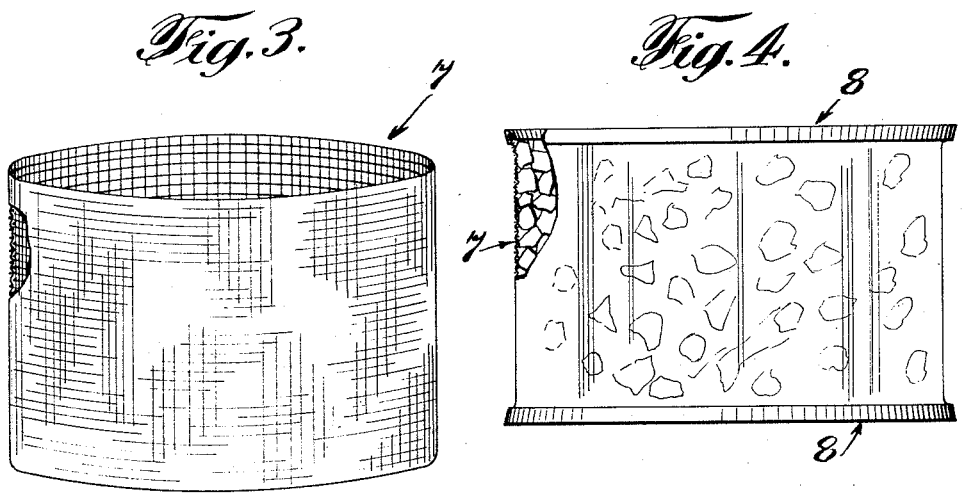
INVENTOR
Thomas M. Rector,
BY Frank J. Kent
ATTORNEY May 8, 1934.   T. M. RECTOR   1,957,554
METHOD OF FORMING TRANSPARENT CONTAINERS
Filed July 26, 1929   2 Sheets-Sheet 2
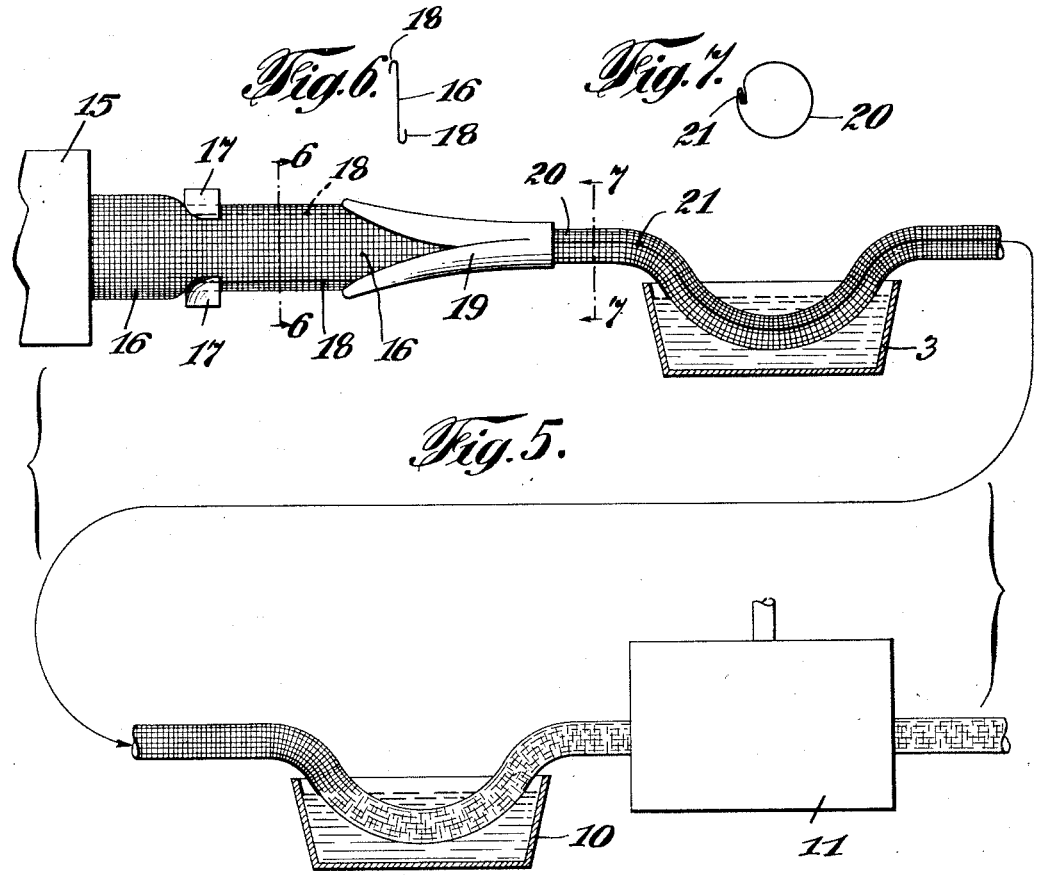
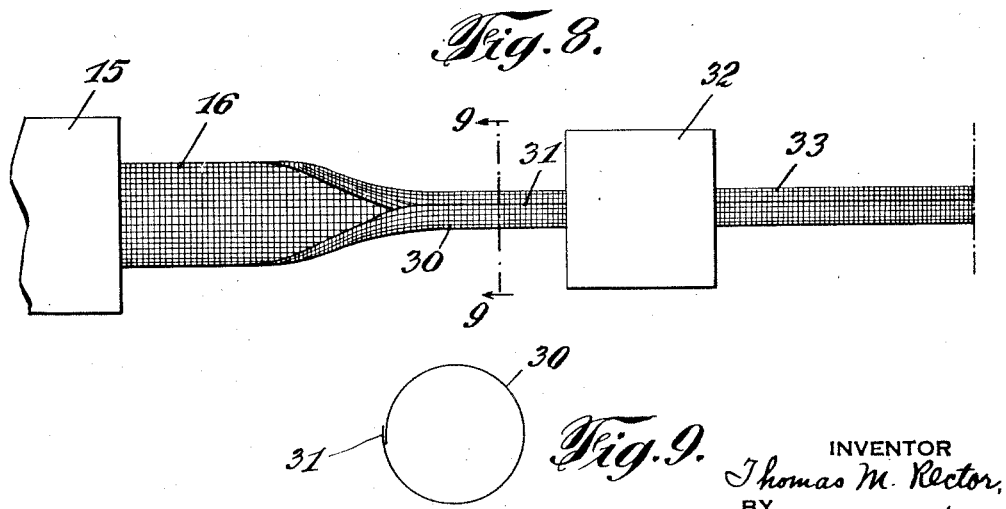

Patented May 8, 1934

1,957,554

UNITED STATES PATENT OFFICE 1,957,554

METHOD OF FORMING TRANSPARENT CONTAINERS

Thomas M. Rector, Rutherford, N. J.

Application July 26, 1929, Serial No. 381,129

11 Claims. (Cl. 29—148.2)

This invention relates to a novel method of producing re-enforced, transparent tubing capable of many uses, but especially desirable for use as container bodies of the character disclosed in a companion application, Serial No. 377,358, filed July 11, 1929, and also to the method of making complete containers, of the general character disclosed in said application, including the formation of the tubular re-enforced bodies and completion of the containers by application of ends or caps.

Briefly described, the method comrises the production of a continuous tube of wire mesh, of any suitable mesh dimension, coating the continuous tube by immersion, or otherwise, with suitable transparent material preferably of the character generally described as liquid converted cellulose (such as cellulose nitrate, cellulose acetate, viscose, mixtures of such materials, etc.), drying the coated tube (and usually incidentally recovering the solvent) and severing the completed tube into suitable lengths for the purpose in view. With respect to production of containers, the process also further includes the completion of the container by application of metal ends or caps by machines and processes known in the can art and as referred to in the above identified application.

When necessary or desirable, in the formation of the coated tube, the steps of coating and drying may be repeated in order to increase the thickness of the transparent coating.

The wire mesh tube may in some cases be produced in seamless form; otherwise, the weaving machine may produce a flat strip of wire mesh which is thereafter bent to cylindrical form with edges connected in any of various ways as referred to hereafter, and then coated and otherwise treated as above, or as explained in detail below.

The characteristics and advantages of the invention are further sufficiently explained in connection with the following detail description of the accompanying drawings, which show certain representative performances of the process. After considering these examples, skilled persons will understand that many variations may be made without departing from the principles disclosed, and I contemplate the employment of any variations of the process which are properly within the scope of the appended claims.

In the drawings:

Fig. 1 is a diagrammatic representation of apparatus explaining one performance of the process.

Fig. 2 explains a variation of the process.

Fig. 3 is an enlarged perspective view of a complete tube section or can body, with a part in section.

Fig. 4 is a side elevation of a complete container or can with a part in section.

Fig. 5 is a diagrammatic representation of a modified performance of the process.

Fig. 6 is a section at 6—6, Fig. 5.

Fig. 7 is a section at 7—7, Fig. 5.

Fig. 8 is a diagram showing another variation of the process.

Fig. 9 is a section at 9—9, Fig. 8.

In Fig. 1, 1 is a diagrammatic representation of any known or suitable weaving mechanism for producing a continuous, seamless tube 2 of woven wire, substantially similar to wire screening in tubular form. The tube may be cylindrical or may be shaped to other desired cross-sectional forms, such as oval or polygonal, either in the process of weaving or subsequently. The cylindrical form is illustrated. The continuous tube as it emerges from the weaving mechanism is coated with a suitable transparent material, or filler, of character sufficiently indicated above. In the broader aspect of the invention, there is no limitation as to the mode of application of coating. In a preferred performance of the process, however, the tube is passed through a bath 3 of the material 3a in liquid form, the tube being sufficiently flexible to be curved and depressed into the bath. The tube is then passed through any suitable drier 4 (also diagrammatically represented) wherein the solvent is evaporated with desired rapidity and may be recovered by means sufficiently represented by the pipe 5, through which the vaporized solvent may be drawn off and condensed. The complete tube 6 issuing from the drier then consists of the wire mesh re-enforcement and the cellulose coating completely covering the re-enforcement and filling its interstices; and the tube is severed into individual sections 7 of any suitable length. The container, Fig. 4, is then completed by applying metal ends or caps 8 to a body consisting of one of the re-enforced tubes 7, by any ordinary machines or methods as employed in the production of single or double-seamed tin cans. The characteristics and advantages of the container per se are further explained and claimed in the above identified application.

Fig. 2 illustrates a variation of the process in which after the first coating and drying operations, the tube 6 is passed through a second bath 10 of similar coating material, in order to increase the thickness of the coating, and again dried in a second drier 11, producing the double coated tube 12, from which individual double coated sections 13 are cut.

Fig. 5 illustrates modifications or variations in the process. The principal variation consists in forming the wire mesh material, in a suitable weaving machine 15, in the form of a continuous flat strip 16. The margins of the strip are turned respectively up and down by any suitable instrumentalities, diagrammatically indicated at 17, producing hooked margins 18 (Figs. 5 and 6). The strip is then passed through a suitable forming device 19 which bends it to cylindrical form as at 20 and interlocks the hooked formations as at 21, Figs. 5 and 7, thus producing a lock-seam. The tube is then passed through a coating bath 3, or otherwise coated with material of the class indicated, and if desired is subjected to further treatment as in a second bath 10 and dried in a drier 11 as before. Of course, the tube may also be dried after treatment in the bath 3 as indicated in Fig. 1.

Fig. 8 indicates a variation in which the continuous flat strip 16 is produced as in the last example and bent to tubular form 30 with edge margins overlapping as at 31, Figs. 8 and 9. These margins may be secured together in any of various ways, as by soldering in soldering mechanism diagrammatically represented at 32. Or, the margins may be secured by welding, in which case the item 32 will be suitable welding apparatus. If the wire mesh is of steel or iron, it may be galvanized, and in this case, the item 32 will be any suitable galvanizing apparatus for applying the zinc coating, and this coating may suffice to sufficiently secure the overlapped margins 31 together until they are further secured by application of the cellulose coating. Leaving the device 32 of whatever character, the tube 33 with lapped edge margins sufficiently secured together, is carried on to the coating apparatus and otherwise treated, as in any of the previous examples.

I claim:

1. The disclosed method of producing reenforced transparent tubing, comprising producing a continuous strip of wire mesh material, bending the strip to tubular form, coating the tube, thereby completely filling the meshes of the tube, and severing individual tubular pieces therefrom.

2. The disclosed method of producing reenforced transparent tubing, comprising producing a continuous strip of wire mesh material, bending the strip to tubular form, securing edges of the tube together, coating the tube, and severing individual tubular pieces therefrom.

3. The disclosed method of producing reenforced transparent tubing, comprising producing a continuous strip of wire mesh material, bending the strip to tubular form, welding edges of the tube together, coating the tube, thereby completely filling the meshes of the tube, and severing individual tubular pieces therefrom.

4. The disclosed method of producing reenforced transparent tubing, comprising producing a continuous strip of wire mesh material, bending the strip to tubular form with edge margins overlapped, coating the tube, thereby completely filling the meshes of the tube, and severing individual tubular pieces therefrom.

5. The disclosed method of producing reenforced transparent tubing, comprising producing a continuous strip of wire mesh material, bending the strip to tubular form, producing cooperating hook formations in margins of the strip, bending the strip to tubular form and interlocking the hook formations, coating the tube, thereby completely filling the meshes of the tube, and severing individual tubular pieces therefrom.

6. The disclosed method of producing reenforced transparent tubing, comprising producing a continuous strip of wire mesh material, bending the strip to tubular form, coating the tube, thereby completely filling the meshes of the tube, drying the coating, and severing individual tubular pieces therefrom.

7. The method of producing containers which comprises applying dissolved transparent coating material to a continuous wire mesh tube thereby completely filling the meshes of the tube, drying the coating, cutting the tube into individual body lengths, and seam-connecting sheet metal ends to end margins of the body lengths.

8. The method of producing containers which comprises applying liquid converted cellulose coating material including a solvent to a continuous wire mesh tube thereby completely filling the meshes of the tube, drying the coating, cutting the tube into individual body lengths and seam-connecting sheet metal ends to end margins of the body lengths.

9. The method of producing containers which comprises producing a continuous tube of woven wire mesh, applying to it a coating of liquid converted cellulose material thereby completely filling the meshes of the tube, drying the coating, cutting the tube into individual body lengths, and seam-connecting sheet metal ends to end margins of the body lengths.

10. The method of producing containers which comprises producing a continuous tube of woven wire mesh, passing the tube through a bath of liquid converted cellulose material thereby completely filling the meshes of the tube, passing the coated tube through a drier, cutting the tube into individual body lengths, and seam-connecting sheet metal ends to end margins of the body lengths.

11. The method of producing containers which comprises producing a continuous tube of woven wire mesh, passing the tube through a bath of liquid converted cellulose material thereby completely filling the meshes of the tube, passing the coated tube through a drier, recovering the solvent removed from the coating in the drier, cutting the tube into individual body lengths, and seam-connecting sheet metal ends to end margins of the body lengths.

THOMAS M. RECTOR.